Oct. 18, 1966  J. F. HARDY  3,279,527
SOLAR EVAPORATION WITH FLOATING CARBONACEOUS MATERIAL
Filed March 8, 1965
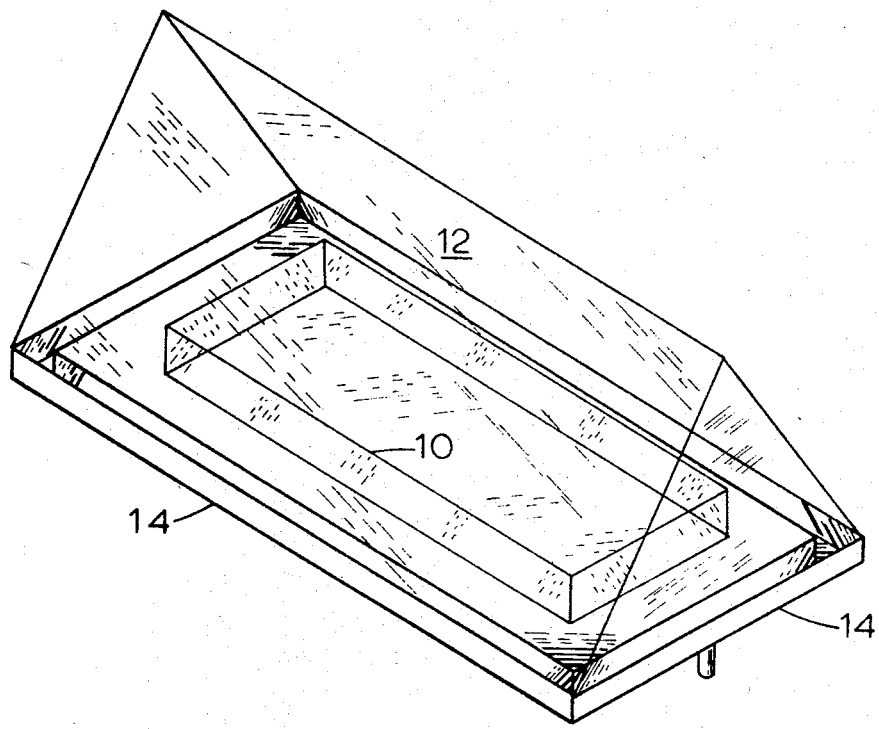
INVENTOR.
JOHN F. HARDY
BY United States Patent Office 3,279,527
Patented Oct. 18, 1966

3,279,527
SOLAR EVAPORATION WITH FLOATING CARBONACEOUS MATERIAL
John F. Hardy, Andover, Mass., assignor to Cabot Corporation, Boston, Mass., a corporation of Delaware
Filed Mar. 8, 1965, Ser. No. 437,891
8 Claims. (Cl. 159—47)

The present invention relates generally to processes for the evaporation of water and more specifically to a novel improved process for evaporating water by solar radiant energy.

Since the beginning of time man has considered his sources of fresh water as a most valuable possession. It is sociological and historical fact that where there exists an abundance of fresh water there exists a fundamental requisite for industrial, agricultural and population growth. From about the time of the industrial revolution it has become increasingly important, due primarily to the continuously expanding needs of industry, that new sources of fresh water be found. One of the potentially more attractive sources of fresh water resides in the oceans and seas of the world. However, in order to produce fresh water from saline water, saline water must be treated by processes such as evaporation and distillation which heretofore have been prohibitively expansive and/or slow. One of the processes which has been particularly theoretically attractive comprises evaporating sea water utilizing solar radiant energy and thereafter condensing the evaporated water by any suitable method. Said process of course occurs naturally during evaporation from the surface of the seas, the energy from said evaporation being supplied by solar radiation. However, the rate of evaporation in said natural phenomenon is normally entirely too slow to be of practical value.

On a smaller scale, the problems of economic evaporation of saline water by means of solar radiant energy has been recalcitrant to the efforts of several industries and in particular the magnesium metal producing industry. Magnesium, in the form of chloride salts is generally present in sea water to the extent of between about 1200 and 1300 p.p.m. However, in order to extract the magnesium salt content from sea water, the concentration of magnesium salts is preferably increased prior to extraction, such as by distillation or evaporation of a portion of said water. Many attempts have been made to accomplish the concentration of sea water by evaporation thereof with solar radiant energy. However, said attempts have generally met with failure because the size of the system or apparatus required to provide a sufficient rate of evaporation from a given volume of water has been excessively large. With the advent of the present invention, however, the rate at which water can be evaporated from the surface of aqueous solutions by heating with radiant energy has been vastly increased.

It is a principal object of the present invention to provide an improved process for the evaporation of water by radiant energy.

It is another object of the present invention to provide an improved process for the evaporation of water by solar energy.

It is another object of the present invention to provide a process for markedly increasing the rate of concentration due to solar radiant energy of aqueous solutions comprising dissolved salts.

It is another object of the present invention to provide an improved evaporation process for recovering fresh water from saline water.

Other objects of the present invention will in part be obvious and will in part appear hereinafter.

We have discovered that the evaporation rate of aqueous solutions heated by solar radiant energy is remarkably increased when there is disposed on the surface of said aqueous solutions hydrophobic particulate carbonaceous materials.

For the purposes of the present invention, the term "solar radiant energy" encompasses that form of energy characterized by the ability to pass through gases without substantial heating thereof while maintaining the ability to substantially heat solids and liquids. The bulk of the sun's radiant energy resides in electromagnetic radiation; hence, sources other than the sun which can supply said type and quality of radiation are also suitable. For instance, an energy source such as infra-red lamps, and the like produce radiational energy suitable for the purposes of the present invention.

Generally many particulate carbonaceous materials comprising above about 35 and preferably above about 60 wt. percent elemental carbon and which are available in average particle sizes below about one inch and preferably below about one micron are suitable for the purposes of the present invention. Among some familiar natural forms of carbonaceous materials which are often suitable are: coal, coke, gas coke, anthracite, charcoal, etc. Said materials can be crushed, abraded or treated in any manner by which the particle size set forth hereinabove is achieved. Also suitable however, and generally preferred because they are readily available in average particle sizes below about 0.5 micron are those forms of carbonaceous materials which are artificially produced and are generally referred to as carbon blacks such as channel black, oil furnace black, gas furnace black, thermal black, lamp black and the like. Of the artificial forms mentioned above, the furnace blacks and, in particular the oil furnace blacks, are preferred.

Although carbonaceous materials comprising above about 35 wt. percent elemental carbon are generally somewhat more dense than water, said materials nevertheless if fine enough generally tend to float temporarily on the surface of water due to phenomena such as surface tension effects, gas entrapment, etc. The floatabiliy of many of said materials is not normally retained, however. Said materials are generally wettable, and after relatively short periods of immersion, adsorb and/or imbibe sufficient water to sink beneath the surface thereof. After sinking, the effectiveness of the material in the process of the present invention can be either vastly reduced or lost entirely. Accordingly, it is often of the utmost importance that the carbonaceous materials utilized be hydrophobic.

There are many methods by which hydrophobicity can be imparted to carbonaceous materials. One method comprises contacting the materials with various substances such as silicone or hydrocarbonaceous oils. Another suitable method comprises chemically reacting the materials with certain compounds, which reaction renders the materials hydrophobic. For instance, the desired results can be had when carbon black is reacted with organo-silicon compounds such as monohalo-tri-alkyl silanes. Still another method of rendering certain carbonaceous materials hydrophobic can be effected during the production thereof. For instance when a carbon black-producing oil furnace is operated under conditions which provide relatively low turbulence, low overall combustion rates, short residence times and low temperatures, either singly or in combination, the resulting black contains high extract. The term "high extract" is well understood in the carbon black producing industry to allude to relatively high percentages of incompletely converted hydrocarbon feedstock. Such blacks, i.e. those having an extract content of at least 0.1% and particularly those having an extract content of greater than about 0.3% by weight, are normally hydrophobic in character. The process requirements for producing such high extract blacks are well known in the art and need not be further discussed here. Also, some carbon blacks in very fluffy form tend to be non-wettable and accordingly are suitable for most of the purposes of the present invention. In any case, it is frequently important that the carbonaceous materials utilized be non-wettable or possess a hydrophobic character; any means by which said properties can be imparted to the black is generally suitable.

The thickness of the layer of carbonaceous material imposed upon the surface of the water is generally not critical. Too thick a layer tends to reduce the evaporation rate. However, sufficient carbonaceous material should normally be utilized to substantially cover the surface. It should be noted that in certain cases and particularly when large systems such as lakes, bays, inlets, etc., are involved, conditions such as tides, currents, winds, etc., can affect the extent of carbonaceous material coverage. For instance, high winds and wave action will tend to obviate complete coverage of the water surface. However, during relatively calm periods, or when the body of water is relatively protected, the carbonaceous material will generally tend to spread on the surface and thereby affect relatively complete coverage of the water surface. In smaller systems, such as in solar evaporators the environment can generally be controlled to the extent that substantially complete coverage of the water surface is effected and maintained if desired.

A better understanding of the present invention and the advantages accruing thereto can be had when reference is made to the following example which is intended to be illustrative in nature:

*Example 1*

To apparatus of the type illustrated in the attached drawing comprising glass tray 10 having the dimensions 24" x 12" x 6", there is charged sea water to a depth of about 6". Next there is positioned over said tray, finely etched glass enclosure 12 having troughs 14 positioned under lowermost edges 16 so as to collect condensed liquids running down the inner surfaces of the glass. Each of said troughs communicates with a common discharge duct which is positioned over a 1000 milliliter graduate maintained at about 68° F. The entire assembly hereinafter referred to as System I is then exposed to direct sunlight. Simultaneously, there are placed in said sunlight two duplicate assemblies hereinafter referred to as System II and System III respectively. However, in System II there is substantially evenly dispersed on the surface of the water about 25 grams of pelleted Elftex 5, a pelleted oil furnace black produced by Cabot Corporation. In System III there is dispersed on the surface of the water about 25 grams of fluffy Elftex 5 black. The amount of water collected from each of the three systems is measured at two hour intervals, the results of which are shown in Table I below. After about 6 hours, the untreated carbon black in System II is found to have substantially completely sunken to the bottom of the tray while the very fluffy black of System III remains substantially completely on the surface of the water.

TABLE I.—IMPROVEMENT OVER SYSTEM I—THE CONTROL

| Time (hrs.) | System II—Pelleted Elftex 5, percent | System III—Fluffy Elftex 5, percent |
| --- | --- | --- |
| 2 | 18 | 25 |
| 4 | 13 | 25 |
| 6 | 11 | 25 |
| 8 | 10 | 25 |

I am not precisely certain as to the explanation of the effectiveness of the process of the present invention in increasing evaporation rates and thus do not intend to be bound by the discussion which follows. However, I believe that the presence of particulate carbonaceous material on the surface of an aqueous system forms a "heat barrier" between the deeper portions of said system and the solar radiant energy which impinges on the surface thereof. Thus, the bulk of heat transfer occurs near and/or at the surface of the system and is consequently more efficient for the purposes of evaporation. Moreover, the presence of the particles of carbonaceous material may tend to increase the area over which heat transfer takes place at or near the surface.

Obviously, many changes can be made in the above example, description and drawing without departing from the scope of the present invention.

For instance, although only oil furnace blacks were utilized in the above example, other carbonaceous materials having an elemental carbon content of above about 35 wt. percent, such as charcoal or thermal carbon black and which are inherently relatively hydrophobic or are treated so as to become relatively hydrophobic are also suitable.

Moreover, although only saline water was utilized, the benefits accruing from the process of the present invention are obviously also available when applied to fresh water. For instance, coverage of fresh water marshes and swamps with carbonaceous materials in accordance with the present invention will result in increased rates of water evaporation therefrom.

Accordingly, it is intended that the above disclosure be regarded as illustrative and as in no way limiting the scope of the invention.

What I claim is:

1. A process for improving the evaporation rate of an aqueous solution which is exposed to solar radiant energy which comprises applying to the surface of said solution a particulate carbonaceous material having an average particle diameter of less than about one inch and comprising at least about 35% by weight of elemental carbon.

2. The process of claim 1 wherein said particulate material has an average particle diameter of less than about one micron.

3. The process of claim 1 wherein said particulate material has been rendered hydrophobic by treatment with a hydrocarbonaceous oil.

4. The process of claim 1 wherein said particulate material is chosen from the group consisting of charcoal, coal dusk and carbon black.

5. The process of claim 1 wherein said particulate material is carbon black.

6. The process of claim 1 wherein said particulate material is oil furnace carbon black.

7. The process of claim 6 wherein said oil furnace carbon black has an extract content of above about 0.1% by weight of said black.

8. The process of claim 6 wherein said oil furnace carbon black has an extract content of above about 0.3% by weight of said black.

(References on following page)

References Cited by the Examiner

UNITED STATES PATENTS

| | | | |
|---|---|---|---|
| 1,673,429 | 6/1928 | Vinson | 126—271 |
| 3,015,613 | 1/1962 | Edmondson | 202—234 X |
| 3,077,190 | 2/1963 | Allen | 126—271 |
| 3,138,546 | 6/1964 | Muller | 202—234 X |
| 3,194,228 | 7/1965 | Bargues | 126—271 |

FOREIGN PATENTS

| | | |
|---|---|---|
| 236,337 | 11/1961 | Australia. |
| 763,867 | 5/1934 | France. |
| 19,560 | 1914 | Great Britain. |

OTHER REFERENCES

U.S. Dept. of Interior—Office of Saline Water Research and Development—Progress Report No. 31, pp. 4–15, Progress Report No. 50, pp. 33, 34, 80, TD433U56.

NORMAN YUDKOFF, *Primary Examiner.*

J. SOFER, *Assistant Examiner.*